United States Patent [19]

Buhr

[11] Patent Number: 5,028,198
[45] Date of Patent: Jul. 2, 1991

[54] COLLAPSIBLE FULL REACH TRUCK BED HOIST

[76] Inventor: Raymond Buhr, 2361 S. 148th Ave., Omaha, Nebr. 68144

[21] Appl. No.: 396,100

[22] Filed: Aug. 21, 1989

[51] Int. Cl.⁵ .............................................. B60P 1/54
[52] U.S. Cl. .................................... 414/542; 212/180; 212/182; 212/218
[58] Field of Search ............... 414/496, 540, 541, 542, 414/543, 545, 546; 212/180, 182, 218

[56]  References Cited

U.S. PATENT DOCUMENTS

| 2,156,424 | 5/1939 | Barnard | 414/542 |
|---|---|---|---|
| 2,605,914 | 8/1952 | Hala | 414/542 |
| 2,911,118 | 11/1959 | Tapp | 414/549 |
| 2,928,560 | 3/1960 | Wilkin | 414/542 |
| 3,095,099 | 6/1963 | Costello | 414/542 |
| 3,276,610 | 10/1966 | Thatcher | 414/546 X |
| 3,315,825 | 4/1967 | Scheinert | 414/542 |
| 3,341,038 | 9/1967 | Wicklund | 414/542 |
| 3,482,716 | 12/1969 | Leadley | 414/543 |
| 3,794,192 | 2/1974 | Monson | 414/542 X |
| 3,863,782 | 2/1975 | Sandrock | 414/542 |
| 4,219,122 | 8/1980 | Blatchford | 414/542 X |
| 4,297,071 | 10/1981 | Dunbar | 414/542 |
| 4,613,274 | 9/1986 | Stapleton | 414/542 X |
| 4,858,855 | 8/1989 | Dalbera | 414/542 X |
| 4,930,970 | 6/1990 | Sunderland | 414/542 |

FOREIGN PATENT DOCUMENTS

| 1237281 | 3/1967 | Fed. Rep. of Germany | 212/182 |
|---|---|---|---|
| 268670 | 6/1989 | Fed. Rep. of Germany | 414/541 |
| 931523 | 6/1982 | U.S.S.R. | 414/542 |
| 958168 | 9/1982 | U.S.S.R. | 414/546 |
| 2135974 | 9/1984 | United Kingdom | 414/542 |

Primary Examiner—David A. Bucci
Assistant Examiner—Robert S. Katz
Attorney, Agent, or Firm—John A. Beehner

[57]  ABSTRACT

A collapsible full reach truck bed hoist includes a pair of elongated tracks adapted for securement onto the truck bed in parallel spaced apart relation. An inverted U-shaped hoist frame has opposite depending legs connected to trolley structures which are supported on the tracks for longitudinal movement therealong. A hoist is supported on the top crossbar of the hoist frame with freedom of movement along the top crossbar transversely of the truck bed. The hoist frame is collapsible from an upright working position to a lowered transport position and the tracks, upon which the hoist frame rides, are extendable outwardly of the truck bed for supporting the hoist frame above an object on the ground adjacent the truck bed.

18 Claims, 3 Drawing Sheets

COLLAPSIBLE FULL REACH TRUCK BED HOIST

BACKGROUND OF THE INVENTION

The present invention is directed generally to a hoist for lifting loads onto a truck bed and more particularly to a hoist capable of lifting a load placed anywhere on the ground rearwardly of a truck and carrying it to a position anywhere on the bed of the truck.

Various types of trucks are commonly used for transporting heavy objects, such as engine blocks, tall thin pressurized gas containers, oil drums, metal parts and manufactured goods generally. To assist with loading and unloading of such goods, some trucks are equipped with a pivotal boom adjacent one rear corner of the bed. The substantial limitation of such booms, however, is the limitation of their reach. Typically, an object can only be placed on the rear end of the bed opposite the hoist but not close to the hoist, or approximately halfway towards the front of the bed at a distance corresponding to the length of the boom. Any readjustment of a loaded object on the truck bed away from the arc of the boom requires manual moving of the object. Such readjustment of heavy loads on a truck bed is at least inconvenient and potentially hazardous to the safety of an operator due to physical strain or the danger of manipulating a dolly or the like in a relatively confined space on a elevated truck bed.

Another problem with conventional pivot booms is that the truck must be properly situated relative to a load on the ground so that the load lies within the arc of the boom to prevent undue swinging of the load when it is picked up.

Finally, such booms present an obstruction to low clearance passages and increase wind resistance of the vehicle in transit, thereby adversely affecting gas mileage.

A primary object of the invention, therefore, is to provide an improved hoist for loading and unloading objects onto and from a truck bed.

Another object is to provide a truck bed hoist capable of setting a load down at any position on the truck bed.

Another object is to provide a truck bed hoist positionable directly above a load placed anywhere on the ground rearwardly of and adjacent the truck bed.

Another object is to provide a truck bed hoist which is collapsible for reduced wind resistance during transport.

Another object is to provide a truck bed hoist moveable on tracks which are extendable beyond the truck be for placement of a hoist mechanism directly above a load situated on the ground adjacent the truck bed.

Another object is to provide a truck bed hoist which does not occupy or diminish the load storage area on a truck bed.

Another object is to provide a truck bed hoist which is simple and rugged in construction, economical to manufacture and efficient in operation.

SUMMARY OF THE INVENTION

The truck bed hoist of the present invention includes a pair of elongated tracks adapted for securement in transversely spaced apart parallel relation on a truck bed. In a pickup truck, the preferred track position is on the top edge of the sidewalls. A hoist mechanism is carried on the top crossbar of an inverted U-shaped frame having a pair of spaced apart legs which are movably connected to the tracks for fore and aft longitudinal movement of the frame on the tracks. The hoist mechanism is adjustable transversely along the top crossbar of the U-shaped frame. Accordingly, longitudinal adjustment of the frame along the tracks and transverse adjustment of the hoist mechanism on the frame enables placement of the hoist mechanism above any position on the truck bed.

The frame is collapsible from an upright working position to a lowered transport position for reduced wind resistance. Preferably, the opposite legs of the inverted U-shaped frame are pivotally connected to respective trolleys that are longitudinally moveable along the tracks. A releasable brace is provided for securing the frame in its upright working position, which brace is easily disabled to accommodate pivotal movement of the frame to its lowered transport position.

To accommodate the lifting of loads from the ground, each track includes a primary track situated within the longitudinal confines of the truck bed and an auxiliary track which is adapted to be extended rearwardly beyond the truck bed for movement of the frame and hoist mechanism rearwardly of the truck bed upon extension of the auxiliary tracks to the working positions thereof. Each auxiliary track includes releasably bracing for temporarily supporting it in its working position rearwardly of the truck bed.

Advantages of the truck bed hoist of the invention are the maneuverability of an object lifted by the hoist to any desired position on the truck bed and the collapsibility of the unit so that nothing protrudes upwardly to create an obstruction or wind resistance during normal travel of the truck.

DESCRIPTION OF THE PREFERRED EMBODIMENT

Figure 1:
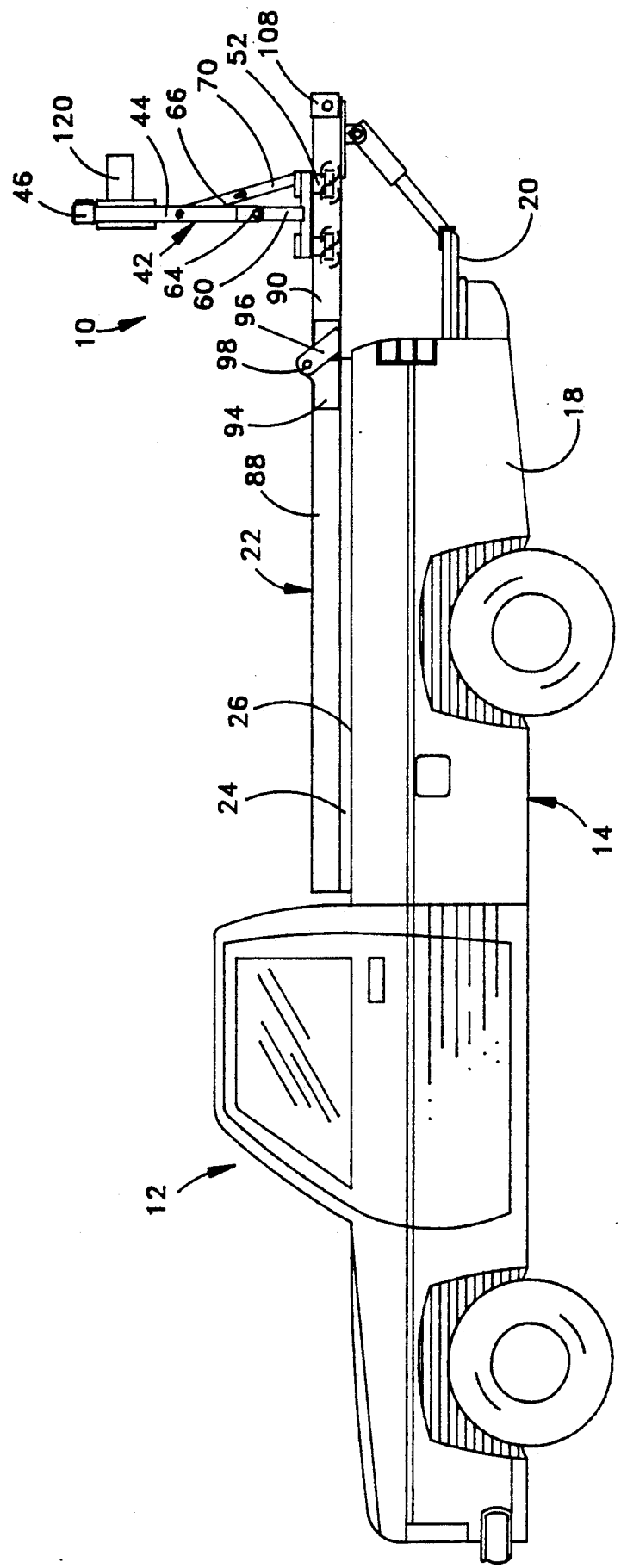
FIG. 1 is a side elevational view of the truck bed hoist of the invention mounted on a pickup truck.
Figure 2:
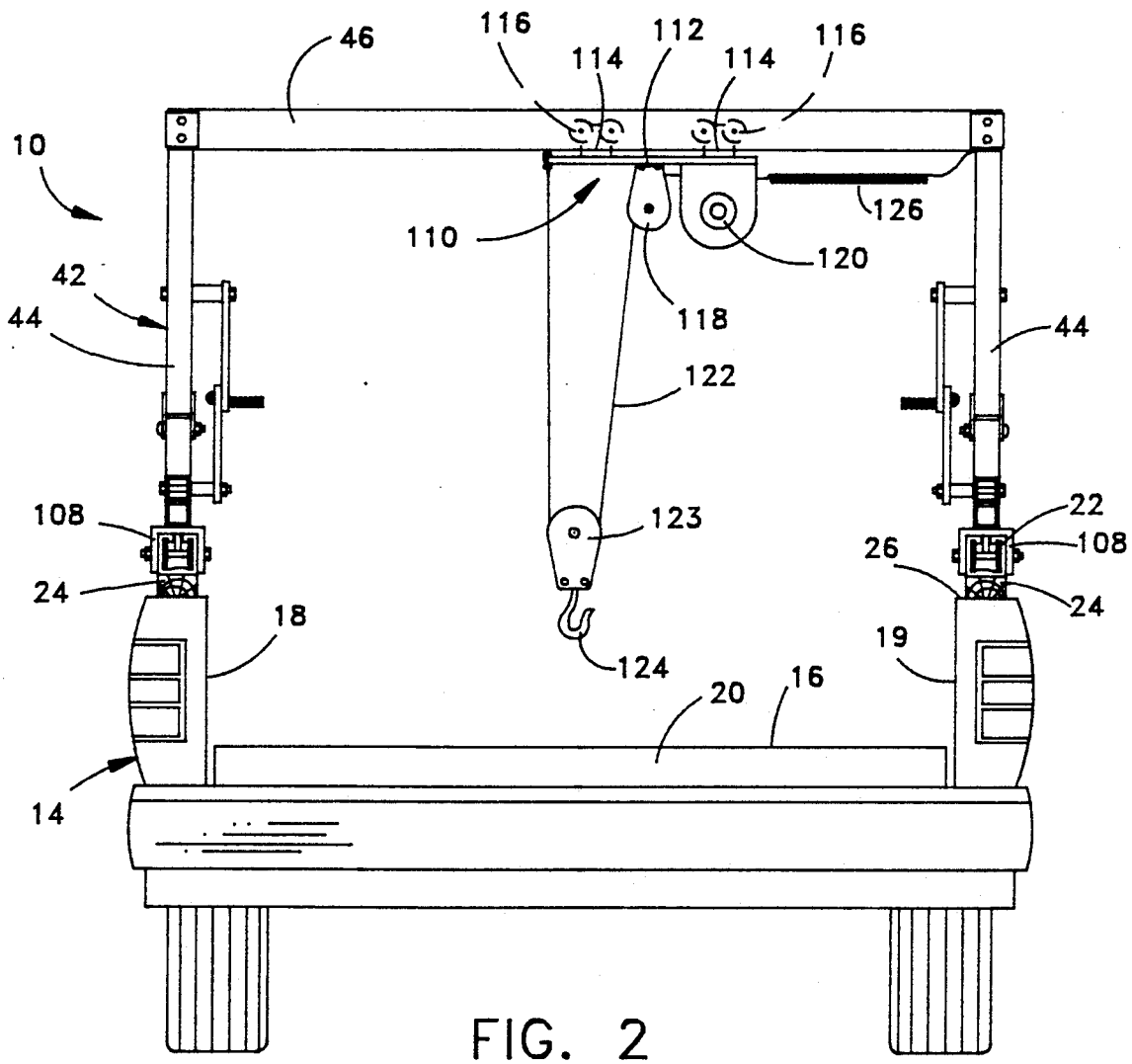
FIG. 2 is a rear elevational view thereof.

The truck bed hoist 10 of the present invention is illustrated in FIGS. 1 and 2 assembled onto a pickup truck 12 having a truck bed 14 which includes a floor surface 16, extended between a pair of transversely spaced apart longitudinally extended sidewalls 18 and 19 and a conventional pivotal tailgate 20.

Since right and left hand sides of the truck bed hoist 10 are generally the mirror image of one another, like reference numerals will be used to designate like parts of each.

Figure 3:
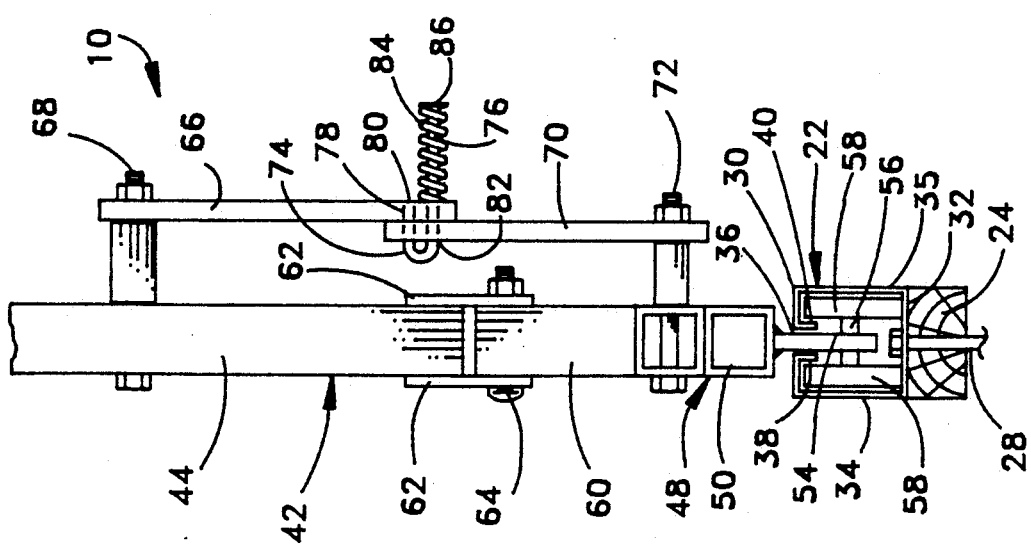
FIG. 3 is a foreshortened, partially sectional rear view of one side of the hoist.

Truck bed hoist 10 includes a pair of elongated tracks 22 adapted for securement in parallel transversely spaced apart relation to a truck bed 14. In the preferred embodiment, each track 22 is supported on a board 24, or other pad which rests on the top surface 26 of the truck bed sidewalls 18 and 19. Each track 22 may be secured to the underlying board 24 by a bolt 28 as indicated in FIG. 3, which bolt may be part of a securement clamp device insertable into the support post openings through the top surface 26 of a conventional pickup truck sidewall 18. Any suitable means may be used for securing the tracks in place.

In this description, "longitudinal" refers to the direction of extension of the tracks 22 and "transverse" refers to the direction perpendicular thereto. Whereas the direction of extension of the tracks 22 in the illustrated embodiment corresponds to the front to back direction of pickup truck 12, the tracks may be otherwise directed on the bed of a different truck.

Track 22 is shown as an elongated channel having a top wall 30, bottom wall 22 and opposite sidewalls 34 and 35. An elongated slot 36 extends centrally throughout the length of top wall 30 and a pair of flanges 38 and 40 depend from top wall 30 on opposite sides of slot 36 to define a pair of elongated wheel slots between the flanges 38/40 and the adjacent sidewalls 34/35.

The tracks 22 support a generally inverted U-shaped frame 42 having a pair of spaced apart legs 44 and a top crossbar 46 connected to and extended between the legs 44, as shown best in FIG. 2. The legs 44 of frame 42 are movably connected to the tracks 22 for fore and aft longitudinal movement of the frame 42 on the tracks. This connection is accomplished by a pair of trolleys 48.

Each trolley 48 comprises an elongated base 50 having a pair of wheel support flanges 52 and 54 protruding downwardly therefrom for passage through track slot 36. Each flange carries a pair of wheel shafts 56 with each shaft rotatively supporting a pair of wheels 58. The wheels roll on the track bottom wall 32 and are constrained against vertical movement by top wall 30 and against transverse movement by the flanges 38 and 40.

Each trolley 48 furthermore comprises an upright support post 60. Each support post is pivotally connected to a leg 44 of the hoist frame 42, as shown in FIGS. 1 and 3, by a pair of ears 62 extending downwardly from each leg and a bolt 64 extended through aligned holes in the top of the post 60 and ears 62.

Figure 4:
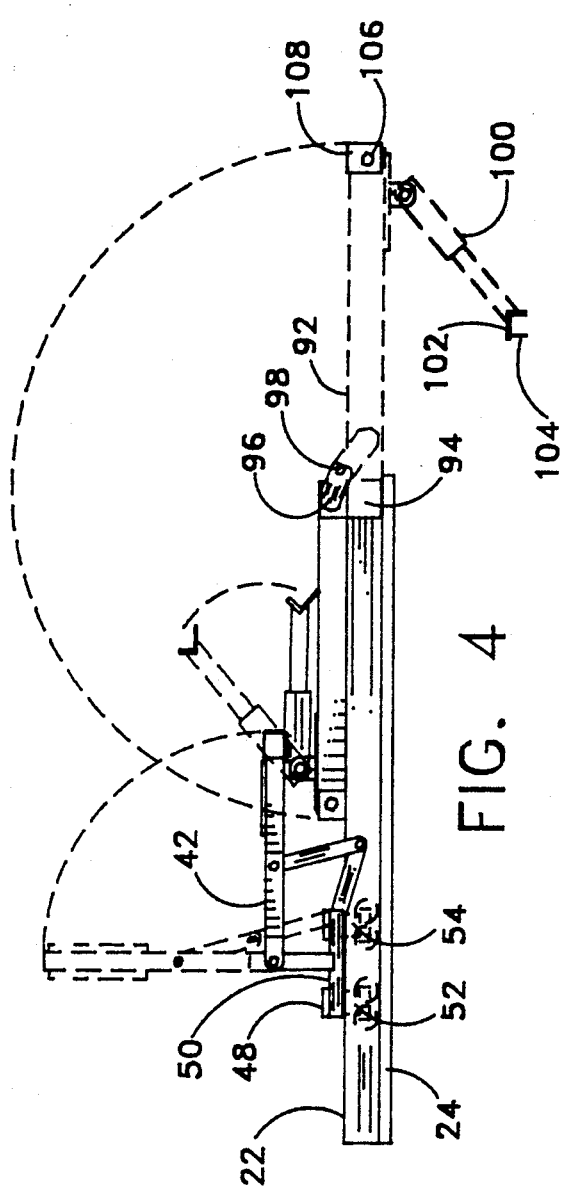
FIG. 4 is an enlarged partial side elevational view of a rearward portion of the hoist showing the range of movement of the auxiliary tracks and hoist frame.

Accordingly, hoist frame 42 is pivotally movable from the dotted line working position in FIG. 4 to the solid line transport position. To realeasably secure hoist frame 42 in its upright working position, a first pivot link 66 is pivotally connected at one end to frame leg 44 by bolt 68. A second pivot link 70 is pivotally connected at one end to the trolley base 50 by a bolt 72 and the opposite ends of the first and second links 66 and 70 are pivotally connected to one another by a J-shaped releasable lock pin 74. Pin 74 has a long leg 76 and a short leg 78 insertable through aligned holes 80 and 82 in the first and second links 66 and 70 to secure those links against relative pivotal movement. A compression spring 84 is secured on long leg 76 by a stop shoulder 86. Spring 84 may be compressed to withdraw short leg 78 from holes 82 to allow the first and second links 66 and 70 to pivot relative to one another about long leg 76 for collapsing the frame 42 to the transport position shown in FIG. 4. Thus, the hoist frame 42 can be secured in the upright working position of FIG. 2 for loading and unloading objects from the truck bed after which the frame is readily pivotally lowered to the solid like transport position of FIG. 4 so that no part of the structure protrudes above the truck cab during transport. This not only minimizes wind resistance, but also safely lowers the frame to a position where the driver need not be concerned with the frame abutting overhead structures such as garage door openings and the like.

In order to lift objects from the ground, it is important that the hoist be movable rearwardly to a position beyond the end of the truck bed 14. Accordingly, FIGS. 1 and 4 illustrated that each track 22 includes a primary track 88, the ends of which are generally situated within the longitudinal confines of the truck bed 14, and an auxiliary track 90 having a forward end 92 pivotally connected to the rearward end of primary track 88 by suitable brackets 94/96 and a pivot pin 98. Auxiliary track 90 is pivotal between the dotted line working position of FIG. 4 wherein auxiliary track 90 is disposed in substantially longitudinal alignment with primary track 88, and the solid like transport position wherein auxiliary track 90 is pivoted forwardly to overlie the rearward end of primary track 88.

It is important to provide some means of structural support for auxiliary track 90 in its extended working position. In the illustrated hoist mounted on pickup truck 12, a support brace 100 is pivotally connected to the underside of auxiliary track 90 and 102. The free end of brace 100 has a short length of L-section channel rigidly secured thereto at an inclination for engaging the rearward end of tailgate 20 as shown best in FIG. 1. A releasable securement pin 104 may be provided on channel 102 for palcement into an aligned hole in the tailgate to prevent accidental displacement of the brace from the tailgate. On other types of trucks, a pivotal brace of a length to engage the underlying truck frame will serve the same purpose.

When the auxiliary tracks 90 are pivoted to their working positions and supported by the braces 100, the trolleys 48 are readily slideable onto the auxiliary tracks 90 rearwardly of the primary tracks 88. The trolleys can roll to the rearward end of auxiliary tracks 90 to the extent of engagement of the wheels 58 with a stop bolt 106 and stop collar 108 illustrated in FIG. 4.

The hoist frame top crossbar 46 may be constructed of the same type of channel members as tracks 22, but inverted so that the elongated slot opens through the underside of the top crossbar 46. A similar hoist trolley 110 includes a base 112 having one or more wheel support flanges 114 extended upwardly through the top crossbar slot for rotatively supporting wheels 116 for rolling movement along the top crossbar 46 transversely of the truck bed.

Any type of manual or power driven hoist may be supported on trolley 110 for facilitating the lifting of loads onto the truck bed. In the illustrated embodiment, the base 112 carries a pulley 118 and an electric winch 120 having a cable 122 trained over pulley 118 and extending downwardly around pulley 123 for attachment to base 112. A hook 124 on the block of pulley 123 is provided for attachment to a load. A wire 126 supplies electric power to the winch 120 from the truck electrical system.

In operation, it can be seen in FIG. 1 that an object can be easily loaded onto truck bed 14 by simply backing the truck to a position where the object is situated just rearwardly of the truck bed. The relative position of the object transversely of the truck is unimportant, since hoist trolley 110 enables the winch or other hoist to be transversely positioned above the object. Upon pivotal extension of the auxiliary tracks 90 to the dotted line working positions of FIG. 4, and upon securement of the support braces 110 onto the truck tailgate 20, the hoist frame 42 is readily rolled onto the auxiliary tracks above the object. The hoist is transversely centered above the object whereupon the cable 122 is secured to the object. Activation of the hoist raises the object above the level of the truck bed floor surface 16 whereupon the hoist frame 42 is advanced forwardly onto primary tracks 88 over the truck bed 14. The longitudinal freedom of movement of the hoist frame 42 on tracks 22 and the transverse freedom of movement of the hoist on the top crossbar 46 of hoist frame 42 enables the object to be set down at any selected position on the floor surface 16 of truck bed 14.

When the truck is ready for transport, the auxiliary tracks 90 are easily pivoted forwardly to their solid line transport positions in FIG. 4 and the hoist frame 42 is pivotally collapsed to its solid like transport position in FIG. 4. Thus, FIG. 4, clearly show that when the auxiliary tracks 90 are in a transport position, they provide a rest support surface for the hoist frame 42 when the hoist frame is also in a transport position. When the truck reaches its destination, the hoist frame 42 and auxiliary tracks 90 are readily pivotally moved to working positions for further loading or unloading of objects onto or from the truck.

Whereas the truck bed hoist of the invention has been shown and described in connection with a preferred embodiment thereof, it is understood that many modifications, substitutions and additions may be made which are within the intended broad scope of the appended claims. For example, whereas the invention is illustrated in connection with a pickup truck, it could alternately be installed on various other types of trucks. The term "truck bed" is used herein to include the bed of the trailer of a semi-tractor trailer combination. The tracks may be mounted directly on the bed of a flatbed trailer, or at an elevated position on the interior sidewalls of an enclosed trailer.

Furthermore, the tracks could be extendable by telescoping auxiliary tracks or tracks that are displaced from their working positions by means other than a pivotal connection to fixed primary tracks. Whereas an electric winch has been shown on the hoist trolley 110, it could be replaced by a manual pulley system, a hydraulic winch, or any other type of lift apparatus. Whereas it is preferred that the tracks be supported on the top surface of the truck bed sidewalls of a pickup truck, they could alternately be secured onto the floor surface 16, or interior or exterior walls of the bed sidewalls. Likewise, the specific design of the tracks 22 and wheeled trolleys 48 and 100 are not critical to the invention. It is the freedom of longitudinal and transverse movement of the hoist that is important for enabling the loading of objects onto the truck bed and placement of the objects at any selected position on the bed.

Thus there has been shown and described a truck bed hoist which accomplishes at least all of the stated objects.

I claim:

1. A collapsible full reach hoist for a truck bed, said hoist comprising,
   a pair of elongated tracks adapted for securement in parallel transversely spaced apart relation to a truck bed,
   a generally inverted U-shaped frame having a pair of spaced apart legs and a top crossbar connected to and extended between said legs,
   means for movably connecting the legs of said frame to said tracks for fore and aft longitudinal movement of said frame on said tracks,
   hoist means movably supported on said top crossbar for side to side transverse movement thereon across a substantial portion of the distance between said legs,
   means for retractably extending each track between a transport position wherein said track is adapted to be positioned substantially within the longitudinal extent of the truck bed, and a working position wherein the outward end of the track is adapted to be positioned outwardly of the truck bed, said hoist means being movable outwardly of the truck bed on said outward ends of the tracks upon extension of said tracks to the working positions thereof,
   means for collapsing said inverted U-shaped frame from a raised working position to a lowered transport position, and
   brace means pivotally mounted on said outward end of said track for supporting said outward end of the track in said working position and for providing a rest support surface for said U-shaped frame when said track is in said transport position and said U-shaped frame is in said lowered transport position.

2. The collapsible full reach hoist of claim 1 wherein each track comprises a primary track and an auxiliary track and said means for retractably extending each track comprises means for pivotally connecting a forward end of said auxiliary track to a rearward end of said primary track for pivotal movement of said auxiliary track between a working position in substantially longitudinal alignment with the primary track and a transport position overlying said primary track.

3. The collapsible full reach hoist of claim 1 wherein said means for movably connecting the frame legs to said tracks comprise a pair of trolleys, each mounted on a respective track for longitudinal movement therealong and said means for collapsing said frame comprising means for pivotally connecting each leg of said frame to a respective trolley.

4. The collapsible full reach hoist of claim 3 further comprising means for releasably securing said frame in the working position thereof.

5. The collapsible full reach hoist of claim 4 wherein said means for realeasably securing said frame in the working position comprises a first pivot link pivotally connected at one end to a frame leg, a second pivot link pivotally connected at one end to said trolley, the opposite ends of said first and second links being pivotally connected to one another, and releasable lock means for securing said first and second links in substantially fixed relation upon pivotal movement of the frame to the working position thereof.

6. The collapsible full reach hoist of claim 1 wherein each track comprises an elongated channel having a top wall, bottom wall and opposite sidewalls, a longitudinally extended slot through said top wall, a pair of flanges depending from said top wall on opposite sides of said slot for defining a pair of elongated wheel slots between said flanges and the adjacent sidewalls.

7. The collapsible full reach hoist of claim 6 wherein said means for movably connecting the frame legs to said tracks comprise a pair of trolleys, each trolley comprises an elongated base, at least one wheel support flange protruding downwardly from the base for passage through said slot in a track top wall and wheel means on said wheel support flange for rolling movement along said wheel slots.

8. In combination with a truck bed, a collapsible full reach hoist, comprising,
   a pair of elongated tracks secured in parallel transversely spaced apart relation to said truck bed, a generally inverted U-shaped frame having a pair of spaced apart legs and a top crossbar connected to and extended between said legs, means for movably connecting the legs of said frame to said tracks for fore and aft longitudinal movement of said frame on said tracks, means for movably connecting the legs of said frame to said tracks for fore and aft longitudinal movement of said frame on said tracks, hoist means movably supported on said top crossbar for side to side transverse movement thereon across a substantial portion of the transverse dimension of said truck bed, means for retractably extending each track between a transport position wherein said track is positioned substantially within the longitudinal extent of the truck bed, and a working position wherein the outer end of the track is positioned outwardly of the truck bed, said hoist means being movable outwardly of the truck bed on said outward ends of the track upon extension of said tracks to the working positions thereof, means for collapsing said inverted U-shaped frame from a raised working position to a lowered transport position, and brace means pivotally mounted on said outward end of said track for supporting said outward end of the track in said working position and for providing a rest support surface for said U-shaped frame is in said lowered transport position.

9. The combination of claim 8 wherein each track comprises a primary track and an auxiliary track and said means for retractably extending each track comprises means for pivotally connecting a forward end of said auxiliary track to a rearward end of said primary track for pivotal movement of said auxiliary track between a working position in substantially longitudinal alignment with the primary track and a transport position overlying said primary track.

10. The combination of claim 8 wherein said means for movably connecting the frame legs to said tracks comprises a pair of trolleys, each mounted on a respective track for longitudinal movement therealong and said means for collapsing said frame comprising means for pivotally connecting each leg of said frame to a respective trolley.

11. The combination of claim 10 further comprising means for releasably securing said frame in the working position thereof.

12. The combination of claim 11 wherein said means for releasably securing said frame in the working position comprises a first pivot link pivotally connected at one end to a frame leg, a second pivot link pivotally connected at one end to said trolley, the opposite ends of said first and second links being pivotally connected to one another, and releasable lock means for securing said first and second links in substantially fixed relation upon pivotal movement of the frame to the working position thereof.

13. The combination of claim 12 wherein said releasable lock means comprises a pair of aligned holes through said first and second links, a generally J-shaped pivot pin having a long leg and a short leg insertable through said aligned holes to substantially secure said first and second links against pivotal movement, bias means urging said legs into said holes, said pin being retractable against the urging of said bias means to withdraw such short leg from said links thereby to enable pivotal movement of said links about said long leg.

14. The combination of claim 8 wherein each track comprises an elongated channel having a top wall, bottom wall and opposite sidewalls, a longitudinally extended slot through said top wall, a pair of flanges depending from said top wall on opposite sides of said slot for defining a pair of elongated wheel slots between said flanges and the adjacent sidewalls.

15. The combination of claim 14 wherein said means for movably connecting the frame legs to said tracks comprise a pair of trolleys, each trolley comprises an elongated base, at least one wheel support flange protruding downwardly from the base for passage through said slot in a track top wall and wheel means on said wheel support flange for rolling movement along said wheel slots.

16. A collapsible full reach hoist for a truck bed, said hoist comprising, a pair of elongated tracks adapted for securement in parallel transversely spaced apart relation to a truck bed, a generally inverted U-shaped frame having a pair of spaced apart legs and a top crossbar connected to and extended between said legs, means for movably connecting the legs of said frame to said tracks for fore and aft longitudinal movement of said frame on said tracks, hoist means movably supported on said top crossbar for side to side transverse movement thereon across a substantial portion of the distance between said legs, means for retractably extending each track between a transport position wherein said track is adapted to be positioned substantially within the longitudinal extent of the truck bed, and a working position wherein the outward end of the track is adapted to be positioned outwardly of the truck bed for movement of said hoist means outwardly of the truck bed upon extension of said tracks to the working positions thereof, means for collapsing said inverted U-shaped frame from a raised working position to a lowered transport position, said means for movably connecting the frame legs to said tracks comprising a pair of trolleys, each mounted on a respective track for longitudinal movement therealong and said means for collapsing said frame comprising means for pivotally connecting each leg of said frame to a respective trolley, means for releasably securing said frame in the working position thereof, said means for releasably securing said frame in the working position comprising a first pivot link pivotally connected at one end to a frame leg, a second pivot link pivotally connected at one end to said trolley, the opposite ends of said first and second links being pivotally connected to one another, and releasable lock means for securing said first and second links in substantially fixed relation upon pivotal movement of the frame to the working position thereof, and said releasable lock means comprising a pair of aligned holes through said first and second links, a generally J-shaped pivot pin having a long leg and a short leg insertable through said aligned holes to substantially secure said first and second links against pivotal movement, bias means urging said legs into said holes, said pin being retractable against the urging of said bias means to withdraw said short leg from said links thereby to enable pivotal movement of said links about said long leg.

17. A collapsible full reach hoist for a truck bed, said hoist comprising, a pair of elongated tracks adapted for securement in parallel transversely spaced apart relation to a truck bed, a generally inverted U-shaped frame having a pair of spaced apart legs and a top crossbar connected to and extended between said legs, means for movably connecting the legs of said frame to said tracks for fore and aft longitudinal movement of said frame on said tracks, hoist means movably supported on said top crossbar for side to side transverse movement thereon across a substantial portion of the distance between said legs, means for retractably extending each track between a transport position wherein said track is adapted to be positioned substantially within the longitudinal extent of the truck bed and a working position wherein the outward end of the track is adapted to be positioned outwardly of the truck bed for movement of said hoist means outwardly of the truck bed upon extension of said tracks to the working positions thereof, each track comprising a primary track and an auxiliary track and said means for retractably extending each track comprises means for pivotally connecting a forward end of said auxiliary track to a rearward end of said primary track for pivotal movement of said auxiliary track between a working position in substantially longitudinal alignment with the primary track and a transport position overlying said primary track, brace means for supporting said auxiliary track in the working position thereof, and said brace means comprising a compression link pivotally connected at one end to said auxiliary track and engagement means on the opposite end adapted for engaging a truck.

18. In combination with a truck bed, a collapsible full reach hoist, comprising, a pair of elongated tracks secured in parallel transversely spaced apart relation to said truck bed, a generally inverted U-shaped frame having a pair of spaced apart legs and a top crossbar connected to and extended between said legs, means for movably connecting the legs of said frame to said tracks for fore and aft longitudinal movement of said frame on said tracks, hoist means movably supported on said top crossbar for side to side transverse movement thereon across a substantial portion of the transverse dimension of said truck bed, means for retractably extending each track between a transport position wherein said track is positioned substantially within the longitudinal extent of the truck bed, and a working position wherein the outer end of the track is positioned outwardly of the truck bed for movement of said hoist means outwardly of the truck bed upon extension of said tracks to the working positions thereof, each track comprising a primary track and an auxiliary track and said means for retractably extending each track comprises means for pivotally connecting a forward end of said auxiliary track to a rearward end of said primary track for pivotal movement of said auxiliary track between a working position in substantially longitudinal alignment with the primary track and a transport position overlying said primary track, brace means for supporting said auxiliary track in the working position thereof, and said truck bed including a pivotal tailgate and said brace means comprises a compression link pivotally connected at one end to said auxiliary track and engagement means on the opposite end adapted for engaging the tailgate.

* * * * *